United States Patent [19]

Becker

[11] 4,124,069

[45] Nov. 7, 1978

[54] HEAT EXCHANGER WITH SPIRALLY WOUND SHEETS

[75] Inventor: Rudolf Becker, Munich, Germany

[73] Assignee: Linde Aktiengesellschaft, Wiesbaden, Germany

[21] Appl. No.: 709,616

[22] Filed: Jul. 28, 1976

[30] Foreign Application Priority Data

Aug. 1, 1975 [DE] Fed. Rep. of Germany ....... 2534442

[51] Int. Cl.$^2$ ............................................. F28D 7/10
[52] U.S. Cl. ................................ 165/164; 203/39; 202/158; 165/170
[58] Field of Search ................. 165/7, 10, 145, 6, 7; 62/13, 14, 44; 202/158

[56] References Cited

U.S. PATENT DOCUMENTS

| Re. 19,140 | 4/1934 | Frankl | 165/10 |
|---|---|---|---|
| 1,956,133 | 4/1934 | Rosenblad | 165/166 X |
| 2,492,788 | 12/1949 | Dennis | 62/13 |
| 2,602,645 | 7/1952 | Benenati et al. | 62/13 |
| 2,683,023 | 7/1954 | Ulander | 165/7 |
| 3,373,798 | 3/1968 | Brummett | 165/10 |
| 3,463,222 | 8/1969 | Grames | 165/10 |
| 3,921,713 | 11/1975 | Schnitzer et al. | 165/167 |

FOREIGN PATENT DOCUMENTS

1,077,508  11/1954  France ...................................... 165/10

Primary Examiner—Charles J. Myhre
Assistant Examiner—Theophil W. Streule, Jr.
Attorney, Agent, or Firm—Karl F. Ross

[57] ABSTRACT

A heat exchanger of the spiral-coil type in which, around a core tube, a sheet of thermally conductive material, e.g. metal, is coiled in a spiral to define passages between the turns of the spiral traversed by fluids to be subjected to heat exchange. According to the invention, neighboring metal sheets define flow passages between them and are sealed along the faces of the sheets and along the longitudinal edges over spaced-apart units of length so that the sections between the sheets are alternately open and closed at the longitudinal edges. The open passages at the longitudinal edges can communicate with a hood through which the fluid is distributed to or removed from a respective passage.

15 Claims, 7 Drawing Figures

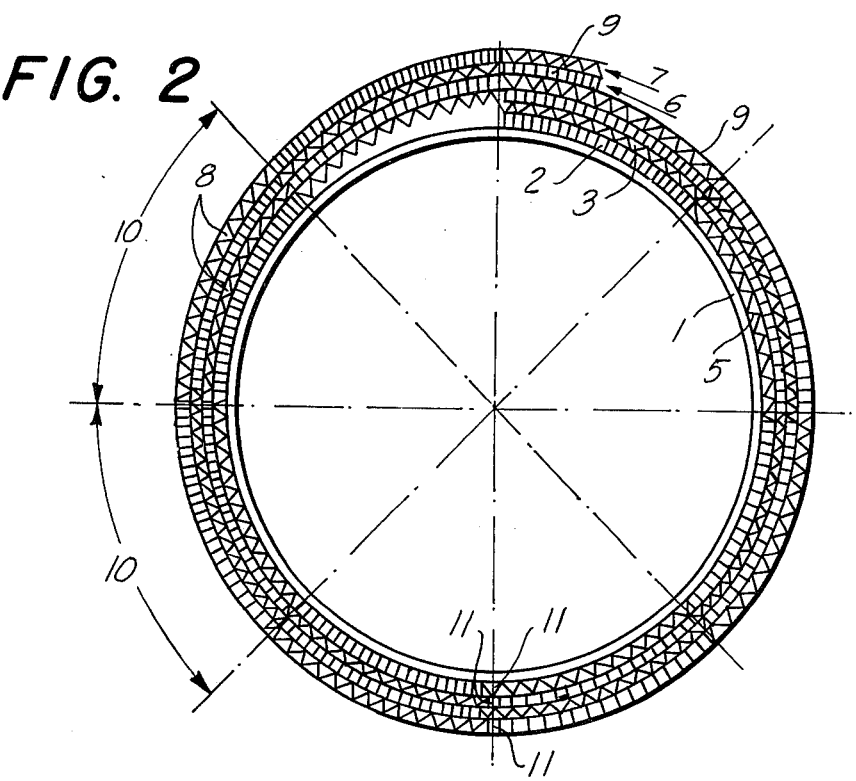
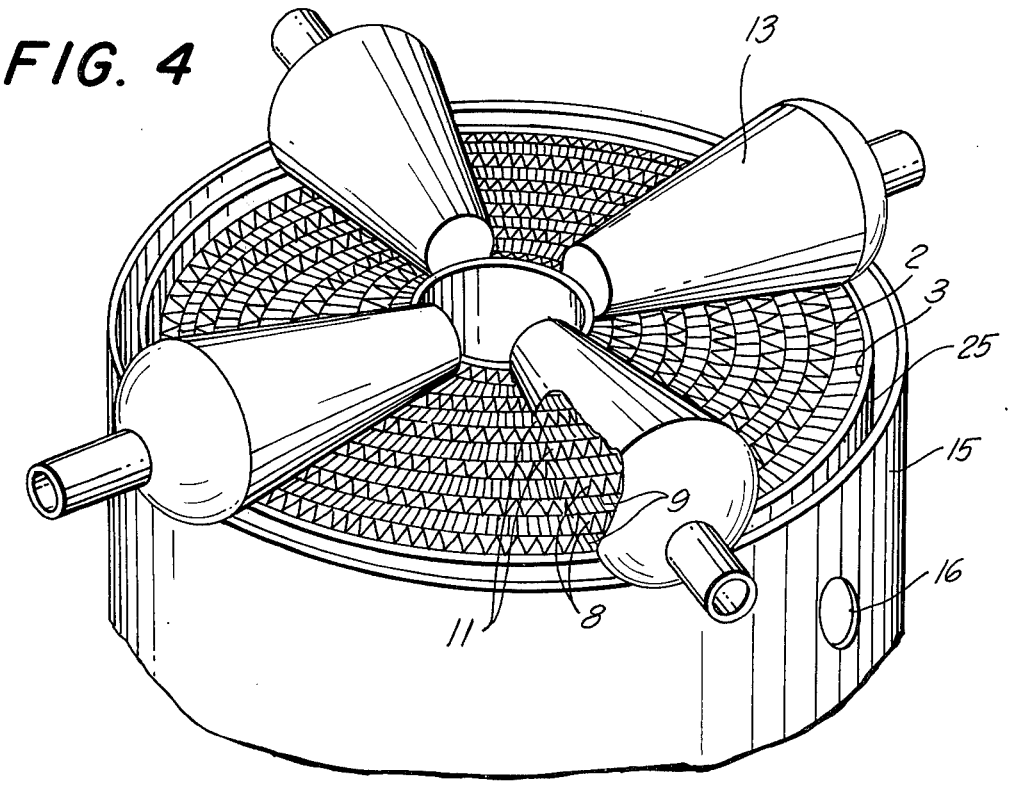

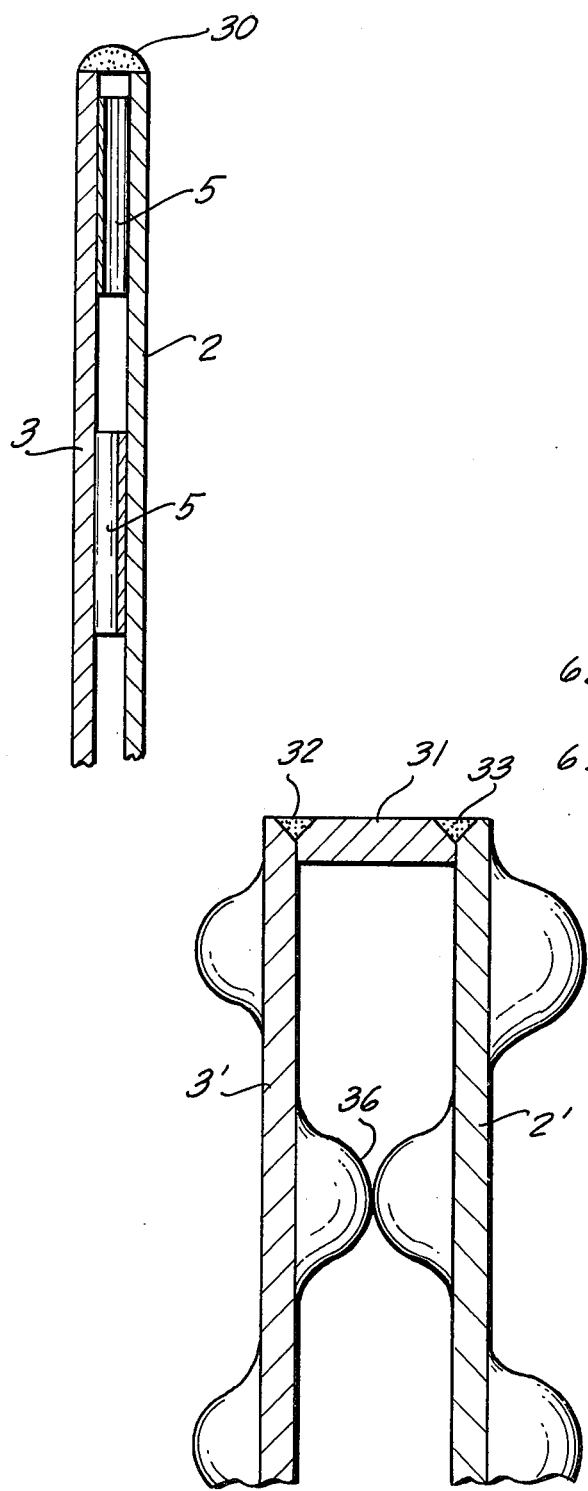
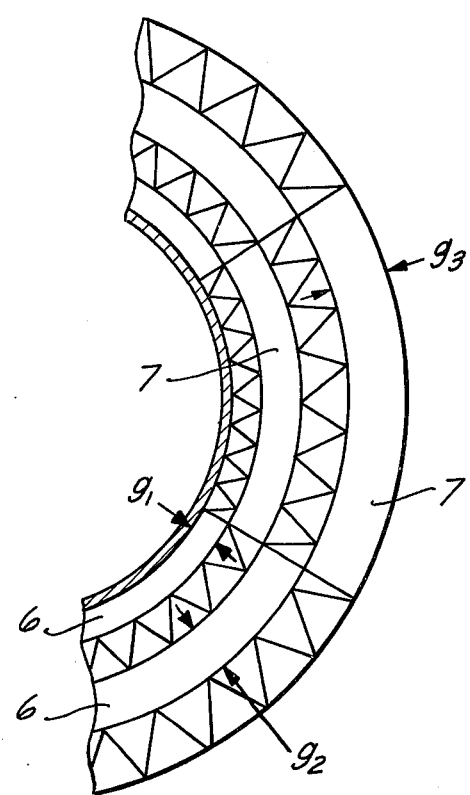

HEAT EXCHANGER WITH SPIRALLY WOUND SHEETS

FIELD OF THE INVENTION

The present invention relates to a heat exchanger of the spiral-sheet type and, more particularly, to a heat exchanger of the kind in which heat exchange between two fluids is effected across a wall formed by thermally conductive spirally wound sheets.

BACKGROUND OF THE INVENTION

Spirally-wound sheet heat exchangers have been proposed heretofore and generally comprise spiral coils of one or more sheets defining passages for the fluid between the turns thereof. The sheets are generally wound in pairs with one fluid passing between the sheets of the pair and the other fluid passing through the turns of each pair of sheets.

The fabrication of such heat exchangers must be held within very narrow structural tolerances and hence the manufacturing costs are high. The narrow tolerances are necessary to prevent mixing of the fluids and to ensure complete sealing of one fluid space from another fluid space.

The planar surfaces of the coil must therefore be substantially completely sealed and hence extremely flat sealing members and machining techniques must be used.

The versatility of the heat exchangers of this known type has been extremely limited and hence it is not always possible to select the flow direction of a particular fluid or to vary the number of fluids which may be subjected to mutual heat exchange. Not all fluids can be passed axially through the system and, in practice, the system has been restricted to the use of two fluids.

The cross-section of the flow passage is dependent upon the gap width between the pair of plates which are coiled and this depends, in turn, on the dimensions of the available sheet metal strip or band and could not be selected at will. Here again the versatility of the system is limited and it is necessary to operate with restricted throughflow capacity.

OBJECTS OF THE INVENTION

It is the principal object of the present invention to provide a heat exchanger of the spirally coiled type of great versatility.

Another object of the invention is to provide a spirally coiled heat exchanger system in which a multiplicity of fluids can be subjected to mutual heat exchange, substantially all with flow in the axial direction.

It is still another object of the invention to provide an axial-flow spirally-coiled heat exchanger of low cost and high capacity.

SUMMARY OF THE INVENTION

These objects are attained, in accordance with the present invention, by providing a heat exchanger of the spiral-coil type in which a pair of sheet metal bands are wound spirally about an axis, preferably tightly around a core tube with spacer means being provided between the bands to define at least two flow passages between the bands of the pair and between the bands of successive turns, the fluids traversing these passages being in heat-exchanging relationship through the heat-conductive bands.

According to the invention, the bands are sealed together along their short sides and are provided with sealed and unsealed segments along their longitudinal sides, the unsealed segments being disposed along different sectors of the spiral and communicating with respective flow passages.

According to a feature of the invention, the ends of the spiral can be formed with equal sectors at which the open segments communicate with a plenum for delivering or receiving the heat exchange fluid. Preferably at least one plenum at each end is formed by a hood extending over the respective sector and communicating with the open segments of one of the flow passages while another segment at each end of the spiral communicates with the other flow passage.

The recited arrangement of the flow passages increases the versatility of the heat exchanger over existing spiral-coil heat exchangers. The throughflow cross section of the passages can be increased simply by increasing the number of turns without simultaneously varying the length of the flow passages to accommodate the particular proportions of the several fluids traversing the heat exchanger. Depending upon the number of metal bands coiled to form the spiral, a corresponding number of fluids can be conducted in heat exchanging relationship through respective flow passages. For example, when two bands are so coiled, the flow cross section between the bands can be traversed by one fluid while the flow passage between the turns can be traversed by another. When three bands are simultaneously coiled, the two spaces between two bands can be traversed by a respective heat exchange fluid while the third heat exchange fluid traverses the flow passage between the turns. Hence the number of flow passages and the number of different fluids which can be passed in heat exchange relationship depends only upon and is equal to the number of bands which are coiled in the spiral.

The heat exchange fluid can be passed in concurrent flow through the heat exchanger, i.e. in the same axial direction, or in counterflow (i.e. in opposite axial directions) through the respective flow passages.

The sealed segments can be formed by directly welding the respective bands together at spaced locations along their longitudinal edges or by adhesively bonding these edges together or by any other relatively simple sealing technique. It is not necessary to fabricate the ends of the spiral perfectly flat since the segments either open into respective hoods or generally into a plenum formed in a housing in which the spiral is disposed so that sealing plates or the like need not be applied. The hoods covering particular sectors can be welded directly to the turns of the band and to the sealed segments thereof.

Furthermore, since the surfaces of the coils need not be especially flat or planar and thus do not have to be machined to insure planarity, the heat exchanger can use bands of a minimum wall thickness since they do not have to withstand machining operations. Thus the heat exchanger can have low weight and high heat transfer coefficients. For example, the wall thickness of each band need only be about 0.3 mm and thus the wall thickness can be determined only by strength considerations without restriction thereon because of fabrication techniques. Extremely small hydraulic diameters with optimum heat exchange characteristics and small overall dimensions can thus be obtained.

According to a feature of the invention, each end of the spiral is formed with at least two sectors with the open segment along the longitudinal edges of the coiled bands in each sector communicating only with a respective one of the flow passages. The open segments of neighboring sectors thus can communicate with different flow passages.

According to another feature of the invention, the open and closed segments are disposed symmetrically with respect to a plane perpendicular to the axis of the spiral coils. This, for example, permits a lower hood to be aligned with an upper hood and allows direction through flow of one of the heat exchange fluids between the hood and through one of the flow passages.

The hoods can be provided within a housing structure that otherwise forms a plenum for the open segments and flow passage which does not communicate with a hood. The sectors can be all of equal size or of different sizes, the latter case enabling the pressure drop for each fluid to be determined in accordance with the requirements thereof.

The flow distribution of the fluids has been found to be especially uniform and effective when the sectors are of the same size and the number of sectors is equal to an integral multiple of the number of heat exchange fluids. For example, when two fluids are passed in heat exchange relationship, two sectors can be provided at each end of the coil, or the number of sectors at each end can be 4, 6, 8 . . . Of course, when three fluids are employed, the number of sectors at each end can be 3, 6, 9 . . .

As has already been mentioned, it has been found to be especially convenient for fabricating the heat exchanger of the present invention, to form the spiral coil around a core tube. Since one or both of the fluids may be under pressure, it is advantageous to provide an outer cylindrical pressure shell which can directly surround the substantially cylindrical outer surface of the coil and support the surface, or can be spaced away from this surface which can be surrounded by a thin sleeve. In this case, the space between the sleeve and the pressure shell is filled with a pressurizing fluid which has a minimum pressure equal to the maximum pressure of the heat exchange fluids. Advantageously, this space can be connected to the system for the heat exchange fluid at the higher pressure.

The heat exchanger according to the present invention can be used effectively as a condenser, e.g. in a LINDE-FRANKL air rectification column. In this case it has been found to be advantageous to provide the respective flow passages of different widths in the radial direction. This system has been found to effectively prevent the blockage of the downflow of condensate by high velocity vapors rising in the flow passages.

The widths of the flow passages for the rising vapor phase can be readily established optimally with respect to the width of the flow passages in which the condensate flows downwardly.

It has been found to be effective in establishing the desired gap spacing of the bands and hence the widths of the flow passages, to provide the bands with protuberances, projections or the like, preferably by pressing or embossing these formations directly in the sheet metal of the band.

The necessary spacing can also be achieved in accordance with a feature of the invention by providing inserts between the bands. These inserts can be sheet metal strips which can be corrugated or otherwise provided with corrugated or tilted inserts which bear upon the juxtaposed faces of the coil bands. The inserts can be introduced loosely between the bands and held in place by the tight coiling thereof. Advantageously, the insert strips are spaced apart along the axis of the coil and lie in planes perpendicular to the coil axis so that some flow of the heat exchange fluid takes place also transversely to the main stream which runs parallel to tha axis of the coils. The inserts do not have to extend, as a rule, up the edges of the coiled sheet metal bands.

Instead of the strips, I may provide inserts between the bands in the form of perforated, apertured, slit or openwork (screen or lattice) sheets, or sheets provided with fins. These sheets may, like the other inserts mentioned above, be soldered or welded to the bands for greater effective heat transfer efficiency.

BRIEF DESCRIPTION OF THE DRAWING

The above and other objects, features and advantages of the invention will become more readily apparent from the following description, reference being made to the accompanying drawing in which:

FIG. 2 is a plan view of the end of a six-turn spirally wound coil assembly for a heat exhanger according to the invention, seen from one axial end before the hoods are applied and with open and sealed segments being illustrated diagrammatically;

FIG. 4 is a perspective view of the end of the assembly shown in FIG. 2 after respective hoods have been set in place and welded to the turns, one of the hoods being broken away;

FIG. 5 is a cross section of the junction between the two plates 2 and 3 as seen in a cross section transversely thereto;

FIG. 6 is a fragmentary view similar to FIG. 2 illustrating a feature of the invention; and FIG. 7 is an enlarged section through a pair of plates to be wound in a spiral coil.

SPECIFIC DESCRIPTION

Figure 1:
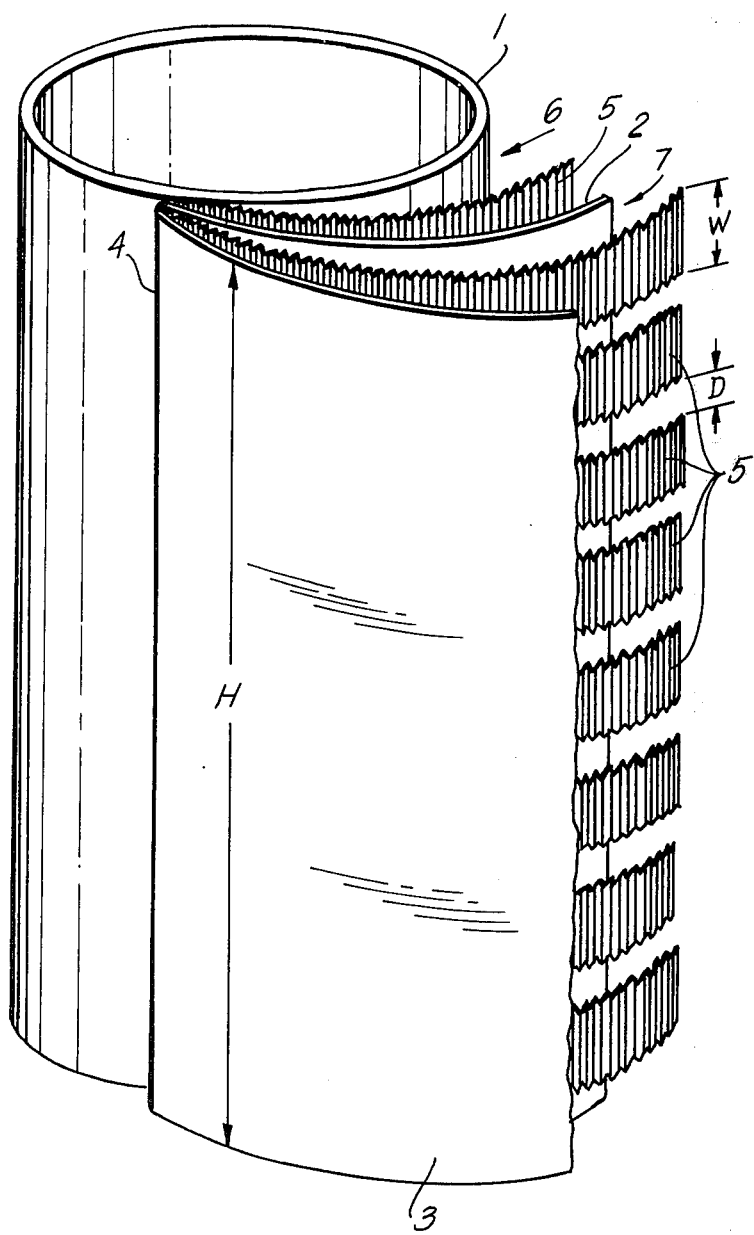
FIG. 1 is a diagrammatic perspective view of the heat exchanger assembly of the invention shown with the coil partially unwound at its inner end.
Figure 3:
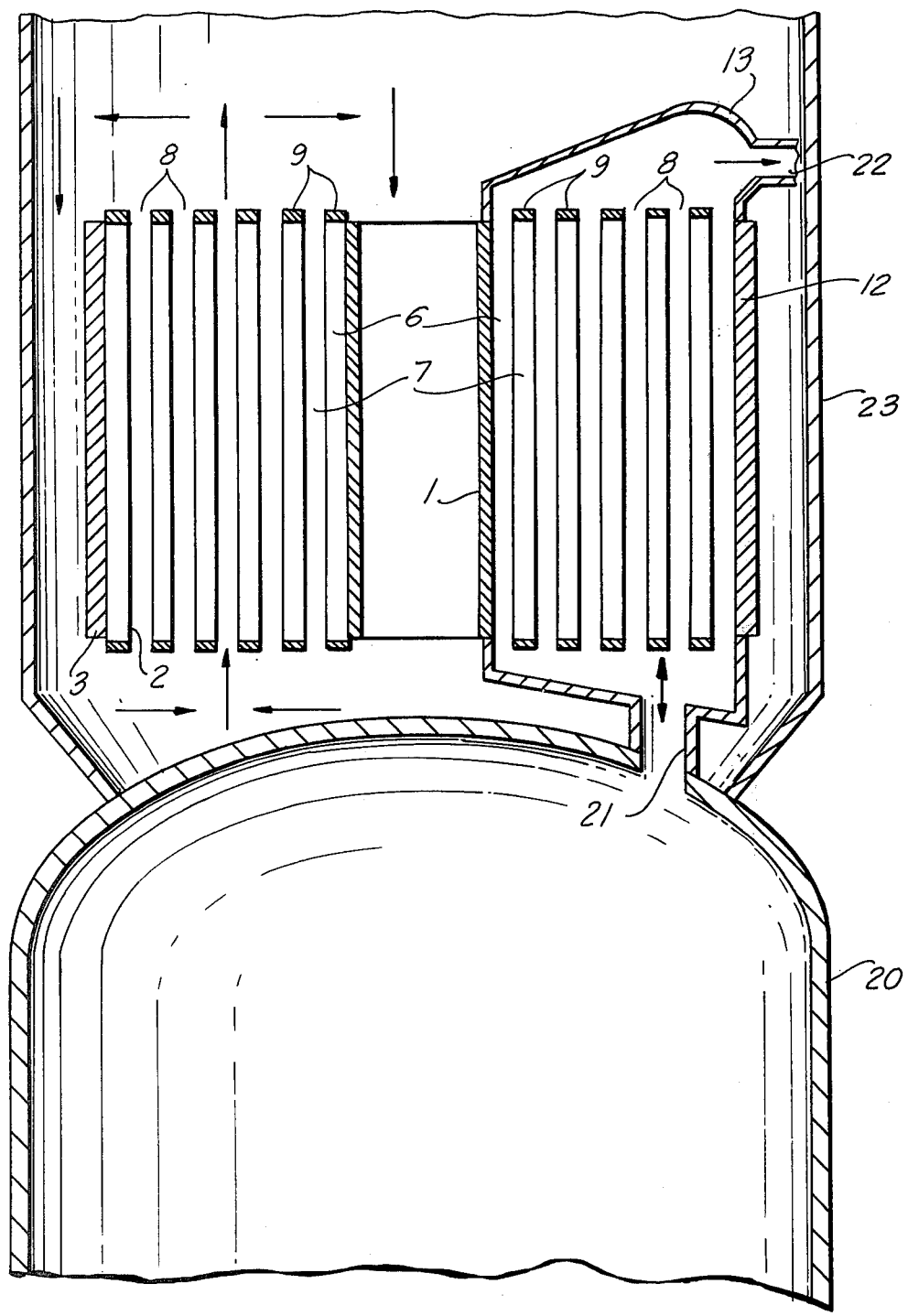
FIG. 3 is a diagrammatic axial section through a heat exchanger according to the invention, the coil lines being shown diagrammatically.

In FIG. 1, I have shown the first stage in producing a spirally wound metal-strip, sheet-metal or metal-band heat exchanger according to the invention. The heat exchanger comprises a plurality of spirally wound turns surrounding a metal core tube 1 of a pair of sheet metal bands 2, 3, which are sealed together along one of their short edges as represented at 4. The bands define between them flow compartments for the fluids to be passed in heat exchanging relationship. Other flow compartments are formed between the inner band 2 and the core tube 1, between the outer band 3 and the inner band 2 of the next turn, and between the outer band and an outer tube which surrounds the spirally wound assembly as can be seen in FIG. 3. The flow passages between the turns on opposite sides of the band 2 are represented diagrammatically at 6 and 7, the passages being also illustrated in FIG. 2 in which the coil is shown to be tightly wound as is actually the case. The beginning of the winding step only has been represented in FIG. 1.

Between the sheet metal bands 2 and 3 and between the outer band 3 of each inner turn and the inner band 2 of the next turn, there are provided inserts 5 which can be continuous, i.e. spirally wound, corrugated strips. As can be seen from FIG. 1, the corrugated strips 5 can have a width W which is a small fraction of the height H of the spirally wound assembly so that a multiplicity of such corrugated strips can be provided in vertically spaced superposed relationship within the coil of the bands 2 and 3 and between the turns of this coil. The vertical distance D between the corrugated strips 5 may be a small fraction of the width W, i.e. 0.4W to 0.1W.

The crest height, i.e. the distance between adjacent crests of the corrugated strip 5, defines the width w of the passage for fluid formed between the bands 2 and 3 and between each turn of the bands 2, 3 and the next turn.

Thus the distance between the inserts is very small and uniform.

Since inserts 5 lie in parallel planes which are spaced apart along the axis of the coil, it is possible to provide a flow of heat exchange fluids which deviates sharply from the main stream.

A soldering or other type of bonding of the inserts with the sheet metal bands 2 and 3 is not necessary since, upon tight coiling of the bands 2, 3, the inserts 5 are seized between them. Advantageously, the crests of the inserts extend parallel to the axis of the coil. However, the crests can also be inclined to the axial direction so as to intersect a generatrix of the spiral, for example, at a predetermined angle, e.g. about 45°, with the crests of alternate strips being inclined in opposite directions so that the crests of neighboring flow channels are inclined at angles of, say, 90° to one another and formed correspondingly inclined flowpaths. The crests of alternating inserts of each flow channel may also extend at right angles to one another.

Instead of the corrugated strip inserts 5 which have been illustrated, a single spacing sheet or a multipartite spacing sheet may be used, the spacing sheet having projections to hold the adjoining bands apart and/or being formed with windows to constitute fluid flow pairs. Several such spacing sheets can be fitted together between the pair of bands and the windows in the spacing sheets can be formed as perforations or slits distributed therein.

The projections or depressions of the spacing sheets can be of any desired configuration and best results are obtained when these projections and depressions are formed by corrugating the spacing sheets.

The inserts can be completely eliminated when the spirally wound bands themselves are formed with projections and/or depressions capable of interengaging so as to hold the bands apart to define the flow passages.

FIG. 2 is an end view of one of the planar extremities of the spiral coil of the heat exchanger before the hoods are applied along sectors thereof. In this Figure it is possible to see the core tube 1 around which the sheet metal bands 2 and 3 have been tightly coiled with the spacer members or inserts 5 retained tightly between them. Along the longitudinal edges of the sheet metal bands 2 and 3, there are open segments 8 and, alternating therewith in a checkerboard pattern, sealed sections 9. As a result of this arrangement of the open and closed sections, the assembly is subdivided angularly into sectors 10. The sealed sections can overlap with those of adjoining turns slightly to facilitate sealing of the flow compartments to be traversed by the respective fluids. As will be apparent from FIG. 2, moreover, the arc length of the alternate sealed and open segments for each sector 10 decreases inwardly although the angular extent of the arc remains constant. In the embodiment illustrated, each of the segments has an angular extent of $360°/8 = 45°$.

FIG. 3 shows a heat exchanger according to the invention in cross section, after hoods 13 have been applied to a given sector at each end of the assembly. The system is shown as part of a condenser for a rectification column which can be used in the liquefaction and separation of the components of atmosphere air in accordance with the LINDE-FRANKL system (see PERRY'S CHEMICAL ENGINEER'S HANDBOOK, pages 28 ff., chapter 12, 4th edition, Mc-Graw-Hill Book co., 1963, New York).

FIG. 3 thus shows the heading of a column to be formed with passages 21 (only one shown) communicating with the hoods 13 of the condenser which consists of the aforementioned spiral coil of bands 2, 3 defining the flow passages 6, 7 between them and sectorily sealed at 9 and open at 8 in a checkerboard pattern. Condensate can flow downwardly through the passages 21 through which the gas to be condensed rises. The noncondensed fraction emerges from the system via outlets 22 from the upper hoods 13. Through the heat exchanger assembly between the hoods 13, the fluids in the upper portion 23 of the double column flow as indicated between arrows so that they pass in heat exchanging relationship (i.e. via the channel 7), with the fluid in the channels 6. The spiral coil is surrounded by an outer tube or shell 12 which holds the assembly under compression in a tightly wound condition. Only portions of the sectors are covered by the hoods 13.

In FIG. 5 I have shown the plates 2 and 3 connected in the region 9 by welded beads 30, i.e. the tops of the plates are welded directly together without an intervening element. However, in the system of FIG. 7, an insert 31 is welded at 32 and 33 to the plates 2' and 3' forming the spiral. In this embodiment, instead of the corrugated inserts 5 (see FIG. 5) the plates or bands are held apart by protuberances 36 formed in the plates. The protuberances 36 bear upon one another although one side of each plate or band may be made flat so as to engage the protuberances projecting from the opposite side of the other band. In FIG. 6 I have shown an arrangement in which the radial gap spacing $g_1$, $g_2$, and $g_3$ for the passages varies from turn to turn. Thus the flow passages 6, 7 have different widths in the radial direction.

In the embodiment illustrated in FIG. 3, the hoods 13, four of which can be angularly equispaced around the coil, communicate with the passages 6 which are closed at 9 in the sectors 10 which are not provided with such hoods. Within the hoods, strips 9 close the passages 7 which remain open in the sectors between the hoods.

The flow passages 6 and 7 can have a greater width at an intermediate region between the core tube 1 and the shell 12 surrounding the coil.

When the heat exchanger is used as a condenser in a LINDE-FRANKL double column and the separation of air into nitrogen and oxygen, the bands 2 and 3 can be smooth, i.e. free from projections or recesses, since inserts 5 are provided. They can be composed of alloy steel, aluminum or an aluminum alloy. The bands 2 and 3 preferably have a thickness between 0.3 and 0.5 mm when composed of alloy steel and a thickness of 0.5 to 1 mm when composed of aluminum or an aluminum alloy.

The inserts 5 can have a width W of 5 to 20 mm and can be sinusoidally corrugated with crest-to-crest spacing equal approximately to the radial width of the shells. The inserts 5 can be of a thickness of 0.2 to 0.5 mm when composed of alloy steel and of a thickness between 0.2 and 1.0 mm when composed of aluminum or an aluminum alloy. The spacing between the inserts can be between 20 and 200 mm in the flow passages for the nitrogen and between 1 and 30 mm in the flow passages for the oxygen. The hydraulic diameter of the flow passages 6 and 7 can be between 0.5 and 5 mm.

FIG. 4 shows the ends of the coil and the spiral assembly for, for example, the upper part thereof in which the hoods 13 widen outwardly corresponding to the angular extent of the sectors enclosed thereby. The hoods 13 can also be of progressively increased cross section, i.e. of a generally conical configuration, with the large end of the hoods turned outwardly, to accomodate the larger flow cross section required outwardly from the center of the assembly. The hoods 13 are sealed at 11 to the plates 2, 3 and the closure strips 9 which are also sealed to the plates, whereby one of the heat exchange fluids is confined to the hoods shown at passage 6 and the similar hoods, axially aligned with those illustrated in FIG. 4, at the bottom of the assembly. Between the pressure shell 12 and the spiral coil assembly, there can be provided a sleeve 14 as illustrated in FIG. 4.

The sleeve 14 can be composed of a thin band of aluminum or steel which tightly surrounds the spiral coil and holds the latter in spaced relationship from a pressure shell 15 so that a space 25 is provided between the spiral coil assembly and the shell 15. This annular space forms a pressurizable compartment which can communicate via an opening 16 with a pressure medium. The pressure medium in this space is at a pressure at least equal to the pressure of the heat exchange fluids so as to resist outward forces applied thereby upon the assembly. A bursting or outward springing movement of the coil is precluded. Advantageously, the pressure compartment may communicate directly with the fluid lines supplying the heat exchange fluid under the higher pressure.

The heat exchanger of the present invention can be composed of any suitable material, preferably a readily weldable material with the greatest success having been had with alloy steel, aluminum and aluminum alloy. In the most general terms, the wall thickness of the bands forming the spiral coils should range between 0.3 and 5 mm, while the insert strips should have widths of 5 to 20 mm and a thickness of 0.2 to 5 mm. The spacing between the inserts should be between 1 and 200 mm and the spacing need not be constant within each flow passage or between neighboring flow passages. The preferred hydraulic diameter of the flow passages should be between 0.5 and 10 mm although hydraulic diameters up to 20 mm have been used successfully. The heat exchanger can be a gas/gas heat exchanger, a condenser, a regenerator or a steam condenser for use in electric bag plants, compressor-containing cooling cycles or evaporator cooling cycles. Where sealing is a problem or chemical cleaning may be needed, the higher values within the previously given ranges should be applied.

I claim:

1. A heat exchanger comprising within an enclosure a spirally wound coil in a plurality of turns of a pair of elongated sheet-metal bands sealed together at their short ends and formed alternately along their longitudinal edges with an open and a sealed segment, the spiral formed by said coil defining at least two axial flow passages for respective heat-exchange fluids separated from one another by at least one of said bands, and means forming respective compartments in said enclosure communicating separately with said passages at opposite axial ends of the coil to pass said heat-exchange fluids separately and axially through said passages, open and sealed ones of such segments alternating along said longitudinal edges whereby, upon spiral coiling of the bands, the sealed segments alternate with open segments radially from the axis of the spiral and the sealed and open segments are disposed in a checkerboard pattern at opposite ends of the spiral.

2. The heat exchanger defined in claim 1 wherein the sealed segments are formed by direct welding of the pair of bands together.

3. The heat exchanger defined in claim 1 wherein said ends of the coil define at least two sectors, the open segments of one of the sectors communicating exclusively with one of said passages and the open segments of the other said sectors communicating exclusively with the other of said passages.

4. The heat exchanger defined in claim 3 wherein the open and closed segments are each disposed symmetrically with respect to a plane perpendicular to the axis of the spiral.

5. The heat exchanger defined in claim 3, further comprising a hood sealingly communicating with at least one of said sectors.

6. The heat exchanger defined in claim 5 wherein said sectors are all of equal size and the number of sectors is an integral multiple of the number of heat exchange fluids traversing the heat exchanger.

7. The heat exchanger defined in claim 5, further comprising a core tube, said spiral being coiled around said core tube.

8. The heat exchanger defined in claim 7 wherein said enlosure comprises an outer cylindrical pressure shell surrounding said spiral.

9. The heat exchanger defined in claim 8 wherein said pressure shell bears directly upon said spiral.

10. The heat exchanger defined in claim 8 wherein said pressure shell is spaced from said spiral, said spiral being tightly surrounded by a thin sleeve, said heat exchanger further comprising means for introducing a pressurized fluid between said sleeve and said pressure shell.

11. The heat exchanger defined in claim 1 wherein said flow passages have different widths in the radial direction.

12. The heat exchanger defined in claim 1 wherein said bands are formed with protuberances spacing them apart.

13. The heat exchanger defined in claim 1, further comprising insert strips disposed between said bands in spaced apart relationship.

14. The heat exchanger defined in claim 13 wherein said strips are corrugated.

15. The heat exchanger defined in claim 1, further comprising spacer sheets disposed between said bands and provided with openings permitting the passage of said fluid.

* * * * *